(12) United States Patent
Kubo et al.

(10) Patent No.: US 6,435,847 B2
(45) Date of Patent: *Aug. 20, 2002

(54) TURBO-MOLECULAR PUMP (75) Inventors: Atsushi Kubo; Hirochika Ueyama, both of Osaka (JP)

(73) Assignee: Koyo Seiko Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,452

(22) Filed: Jul. 6, 1999

(30) Foreign Application Priority Data

Jul. 8, 1998 (JP) ............................................ 10-192752

(51) Int. Cl.$^7$ ............................ F04B 17/00; F04B 49/00
(52) U.S. Cl. ................. 417/423.4; 417/282; 417/423.8; 417/63
(58) Field of Search ............................. 417/282, 423.4, 417/423.8, 63

(56) References Cited

U.S. PATENT DOCUMENTS

| | | | | |
|---|---|---|---|---|
| 4,904,155 A | * | 2/1990 | Nagaoka et al. | 415/90 |
| 5,027,280 A | * | 6/1991 | Ando et al. | 364/474.16 |
| 5,111,102 A | * | 5/1992 | Meeks | 310/90.5 |
| 5,345,787 A | * | 9/1994 | Piltingsrud | 62/55.5 |
| 5,350,275 A | * | 9/1994 | Ishimaru | 415/90 |
| 5,443,368 A | * | 8/1995 | Weeks et al. | 417/27 |
| 5,577,883 A | * | 11/1996 | Schutz et al. | 415/90 |
| 5,618,167 A | * | 4/1997 | Hirakawa et al. | 417/372 |
| 5,627,421 A | * | 5/1997 | Miller et al. | 310/90.5 |
| 5,667,363 A | * | 9/1997 | Bernbardt et al. | 417/44.1 |
| 5,718,565 A | * | 2/1998 | Kuhn et al. | 417/44.3 |
| 5,961,291 A | * | 10/1999 | Sakagami et al. | 417/42 |

FOREIGN PATENT DOCUMENTS

| | | | | |
|---|---|---|---|---|
| EP | 0 464 571 A1 | 1/1992 | | |
| JP | 2-252996 | 10/1990 | | |
| JP | 4-252883 | 9/1992 | | |
| JP | 6-12794 | 2/1994 | | |
| JP | 8-270651 | 10/1996 | | |
| JP | 2565155 | 12/1997 | | |
| JP | 10-73088 | * | 3/1998 | ............ F04D/19/04 |
| JP | 10-122182 | * | 5/1998 | ............ F04D/27/00 |

OTHER PUBLICATIONS

Taiwan Office Action dated Nov. 9, 2000, with English translation.
DSP TMS 320C25, The Principles and Practical Applications Chapter 0: Preamble, Chapter 1: Introduction, pp. 1–1 ~1–3, written by Wen Zheng Zhong, published by Hui–Gao Publishing Company in Mar. 1995.

* cited by examiner

Primary Examiner—Charles G. Freay
Assistant Examiner—Timothy P. Solak
(74) Attorney, Agent, or Firm—McGinn & Gibb, PLLC (57) ABSTRACT

In a turbo-molecular pump, a rotor is supported by a magnetic bearing (3) in a non-contact mode. A pump control section (2) has a magnetic bearing control device (8) with a digital signal operating processor or DSP (7) which is programmable by a software or which can execute a programmed software. The digital signal operating processor (7) performs the control of a heating system, namely, a heater, as well as the control of the magnetic bearing (3).

8 Claims, 6 Drawing Sheets

TURBO-MOLECULAR PUMP

BACKGROUND OF THE INVENTION

This invention relates to a turbo-molecular pump in which a rotor forming a pump is supported in a non-contact mode with the aid of a magnetic bearing.

Some turbo-molecular pumps of this type are provided with a heating system, namely, a heater, in order to eliminate a problem that compressed gas become coagulated and becomes stuck or accumulated on inside of the pump. In this case, in order to prevent the over-heating, a temperature detecting device is provided. A temperature adjusting unit, which controls the heater according to the output signal of the temperature detecting device, is provided in a pump control section which is adapted to control the magnetic bearing.

In the turbo-molecular pump having the heating system, since the pump control section has the temperature control unit, the pump control section is unavoidably bulky; that is, the resultant turbo-molecular pump has a high manufacturing cost.

SUMMARY OF THE INVENTION

Accordingly, an object of the invention is to solve the above-described problems. More specifically, an object of the invention is to provide a turbo-molecular pump in which, although it includes the heating system, the pump control section can be miniaturized and reduced in manufacturing cost, and which is therefore high in flexibility.

A turbo-molecular pump according to the invention is the one in which a rotor is supported by a magnetic bearing in a non-contact mode, and in which a pump control section has a digital operating system programmable using software or capable of executing a programmed software, the digital operating system performs the control of the heating system and at least part of the other controls. That is, the digital operating system performing the other controls, performs the control of the heating system.

As the digital operating system, a micro-computer, a digital signal operating processor, etc. can be used. In the specification, the digital signal operating processor (or digital signal processor) is dedicated hardware which is programable by a software or capable of executing programmed software, and achieves a high-speed time operation. Hereinafter, it will be referred to merely as a "DSP", when applicable.

The pump control section has the digital operating system, so that the control of the heating system as well as the other controls is carried out thereby. Therefore, unlike the turbo molecular pump discussed in the "Background of the Invention" section, it is unnecessary to provide a temperature adjusting unit in the pump control section. This feature makes it possible to miniaturize the pump control section and to reduce the manufacturing cost. Furthermore, the control of the heating system can be freely designed with the software programs of the digital operating system; that is, the turbo-molecular pump of the invention is considerably high in the flexibility of use. In addition, the digital operating system can be utilized for various other purposes.

For instance, the digital operating system performs the control of the heating system, and at least the control of the magnetic bearing.

In this case, the digital operating system such as a DSP, which is provided in the pump control section to perform the control of the magnetic bearing, can be commonly used to perform the control of the heating system.

For instance, the digital operating system performs the control of the heating system and at least the control of the display system.

In this case, the digital operating system such as a micro-computer, which is provided in the pump control section to perform the control of the display system adapted to display a state of the pump, can be commonly used to control the heating system.

The present disclosure relates to the subject matter contained in Japanese patent application Nos. Hei. 9-194694 (filed on Jul. 22, 1997) and Hei. 10-192752 (filed on Jul. 8, 1998), which are expressly incorporated herein by reference in their entireties.

DESCRIPTION OF THE PREFERRED EMBODIMENT

Preferred embodiments of the invention will be described with reference to the accompanying drawings.

Figure 1:
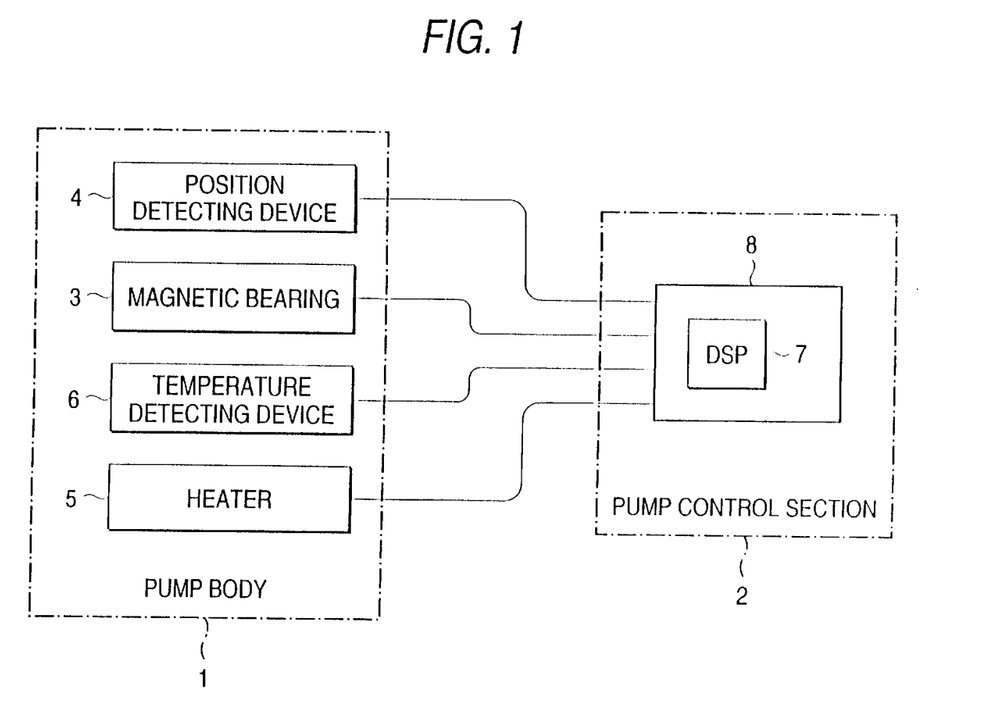
FIG. 1 is a block diagram outlining the arrangement of a turbo-molecular pump, which constitutes a first embodiment of the invention.
Figure 2:
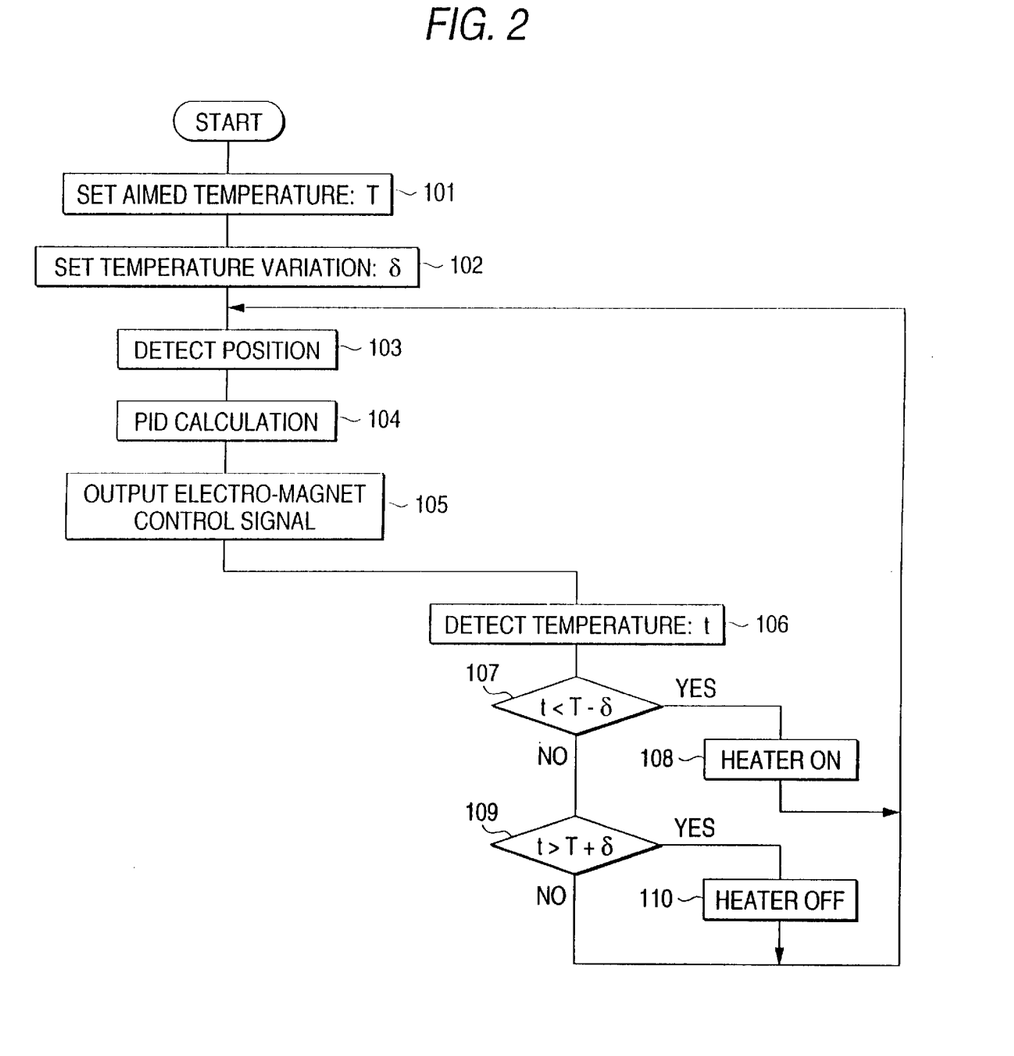
FIG. 2 is a flow chart for a description of an example of the operation of a digital signal operating processor in the magnetic bearing control device of a pump control section shown in FIG. 1.

FIGS. 1 and 2 show an example of a turbo-molecular pump in which a DSP adapted to control a magnetic bearing is provided in a pump control section, which is a first embodiment of the invention.

As schematically shown in FIG. 1, the turbo-molecular pump comprises a pump body (1) and a pump control section (2).

The pump body (1) comprises: a digital control type magnetic bearing (3) which supports a rotor in a non-contact mode which forms the rotary section of the pump; a position detecting device (4) adapted to detect the position of the rotor; a heating system, namely, a heater (5) adapted to heat a predetermined part in the pump body (1); and a temperature detecting device (6) adapted to detect the temperature of a predetermined part in the pump body (1).

The control section (2) includes a magnetic bearing control device (8) with a DSP (7).

Figure 6:
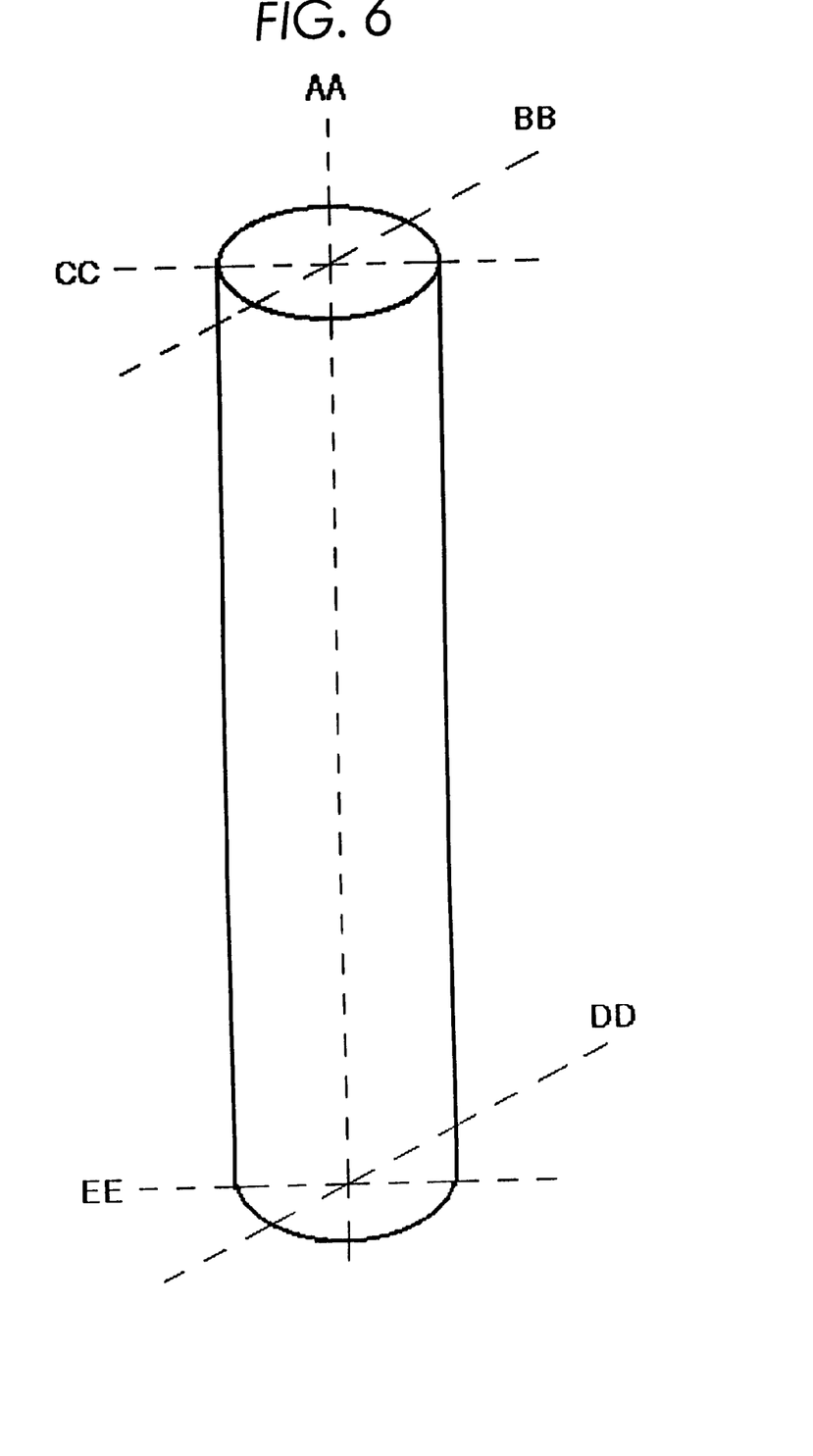
FIG. 6 shows the posture of a rotor along a plurality of axes in a non-limiting embodiment of the invention.

As shown in FIG. 6 (e.g., references AA, BB, CC, DD, EE) magnetic bearing (3) utilizes the magnetic attracting forces of a plurality of electro-magnets to support the rotor (a controlled shaft) in a non-contact mode in an axial direction at one position of the axial direction of the rotor as well as to support the rotor in a non-contact mode in two radial directions, which are perpendicular to each, at two positions of the axial direction.

The position detecting device (4) employs a plurality of position sensors to detect the position of the rotor (the controlled shaft) in the axial direction, and the positions of the rotor (the controlled shaft) in the aforementioned two radial directions, which are perpendicular to each other, at those two positions of the axial direction.

The magnetic bearing (3), the position detecting device (4), the heater (5) and the temperature detecting device (6) may be conventional ones, and therefore the detailed description of them are omitted.

The magnet bearing control device (8) controls the magnetic bearing (3) based on the output signal of the position detecting device (4); that is, the position of the rotor, and controls the on and off of the heater (5) based on the output signal of the temperature detecting device (6), that is, the temperature of the inside of the pump body. More specifically, the DSP (7) outputs electro-magnet control signals corresponding to the electro-magnets of the magnetic bearing (3) to the respective power amplifiers based on the position of the magnetic bearing (3). The power amplifiers apply exciting currents based on the electro-magnetic control signals to the respective electro-magnets, so that the rotor is supported at the aimed position in a non-contact mode. The DSP (7) detects whether or not the temperature of the inside of the pump body (1) is in a predetermined variation range. When it is lower than the variation range, the heater (5) is turned on (heating); and when it is higher than the variation range, the heater (5) is turned off (non-heating). Hence, the temperature of the inside of the pump body (1) is kept in a constant temperature range, which prevents the compressed gas from being coagulated, and stuck and accumulated on the inside of the pump body (1). Furthermore, this feature prevents the over-heating of the heater (5).

An example of the operation of the DSP (7) in the magnetic bearing control device (8) will be described with reference to FIG. 2, a flow chart.

When, in FIG. 2, the operation of the pump starts, the DSP (7) sets an aimed temperature of the inside of the pump body (1) (Step 101), and then sets a temperature variation (Step 102). It is assumed that the aimed temperature set value is represented by T, and the temperature variation set value is represented by δ. Next, a position control operation is carried out. That is, the position of the rotor is detected from the output signal of the position detecting device (4) (Step 103), and a PID calculation is carried out based on the rotor position thus detected (Step 104), and electro-magnet control signals are applied to the respective power amplifiers (Step 105). Next, a heat control operation is carried out. That is, first, the temperature of the inside of the pump body (1) is detected from the output signal of the temperature detecting device (6) (Step 106). It is assumed that the temperature detection value is represented by t. Next, t is compared with (T−δ) which is the lower limit value of the temperature variation range (Step 107). When t is smaller than (T−δ), Step 108 is effected. In Step 108, the heater (5) is turned on, and Step 103 is effected again. When, in Step 107, t is not smaller than (T−δ), then Step 109 is effected. In Step 109, t is compared with (T+δ) which is the upper limit value of the temperature variation range. When t is larger than (T+δ), Step 110 is effected. In Step 110, the heater (5) is turned off, and Step 103 is effected again. When, in Step 109, t is not larger than (T+δ), Step 103 is effected again. Hence, the temperature inside the pump body (1) is kept in a constant temperature range which is substantially equal to the temperature variation range from (T−δ) to (T+δ).

Figure 3:
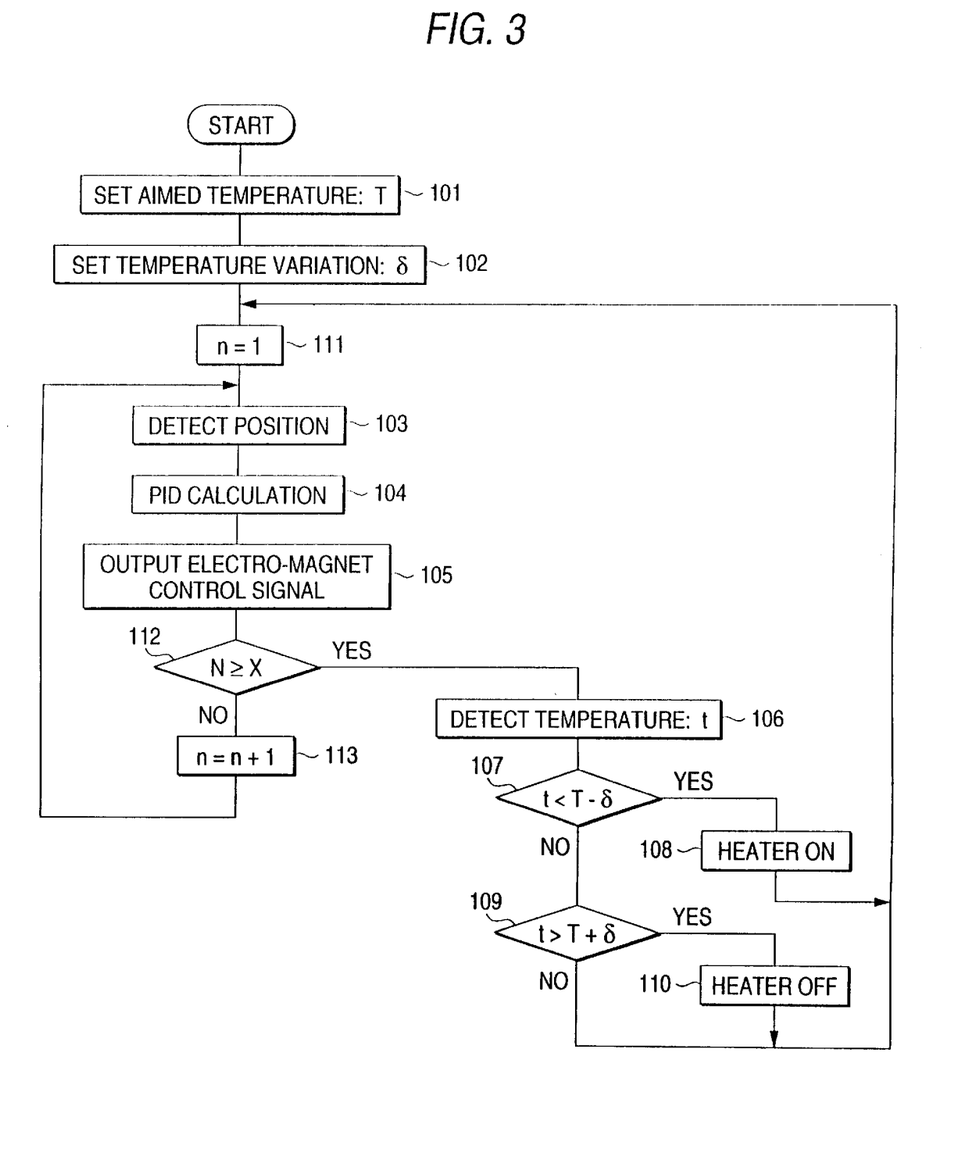
FIG. 3 is a flow chart for a description of another example of the operation of the digital signal operating processor in the magnetic bearing control device of the pump control section shown in FIG. 1.

In the operation of FIG. 2, the position control operation which should be performed at high speed, and the heater control operation are carried out in one operation loop. Therefore, this case takes a long time when compared with the case where only the position control operation is carried out; however, if the DSP is sufficiently large in operating capacity, this does not cause a problem. In the case where the DSP is not of a sufficiently large operating capacity, or in the case where it is necessary to perform the position control operation at higher speed, the following system may be employed: That is, the heater control operation may be carried out intermittently at periodic intervals because it is unnecessary to perform the heater control frequently, and during the intermittent periods the position control operation only may be carried out repeatedly. More specifically, as shown in FIG. 3, a flow chart, after an aimed temperature and a temperature variation have been set in Steps 101 and 102, with the count value n set to 1 in Step 111, the position control operation is carried out in Steps 103, 104 and 105. When, in Step 112, the count value n is smaller than a preset value X (for instance 100 or 1000 which is the number of times of continuous repetition of the position control operation), in Step 113 the count value n is set to (n+1),and Step 103 is effected again to perform the position control operation again. When, in Step 112, the count value n becomes X, the heater control operation is carried out in Steps 106, 107, 108, 109 and 110, and Step 111 is effected again. Thus, whenever the position control operation is carried out a predetermined number of times, the heater control operation is carried out, and the position control operation can be achieved at higher speed.

The magnetic bearing control device (8) may be an other digital operating system such as a micro-computer.

The pump body (1) is provided with an electric motor (not shown) adapted to rotate the rotor. The electric motor may be controlled with the DSP (7) of the magnetic bearing control device (8), or with a motor control device provided only therefor.

Figure 4:
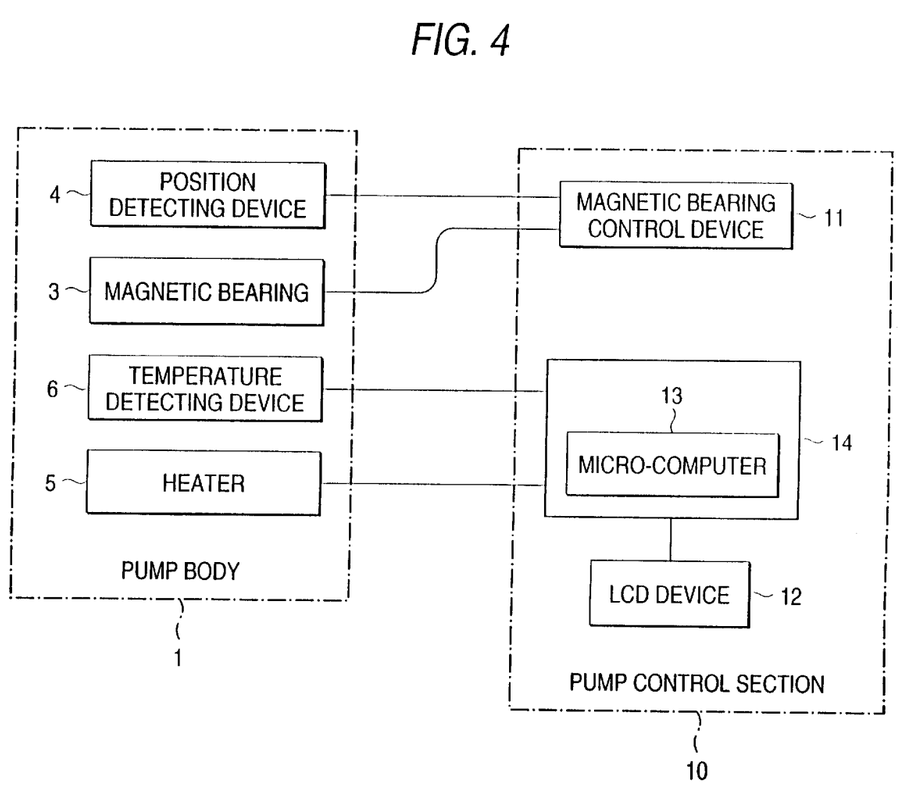
FIG. 4 is a block diagram outlining the arrangement of a turbo-molecular pump, which constitutes a second embodiment of the invention.
Figure 5:
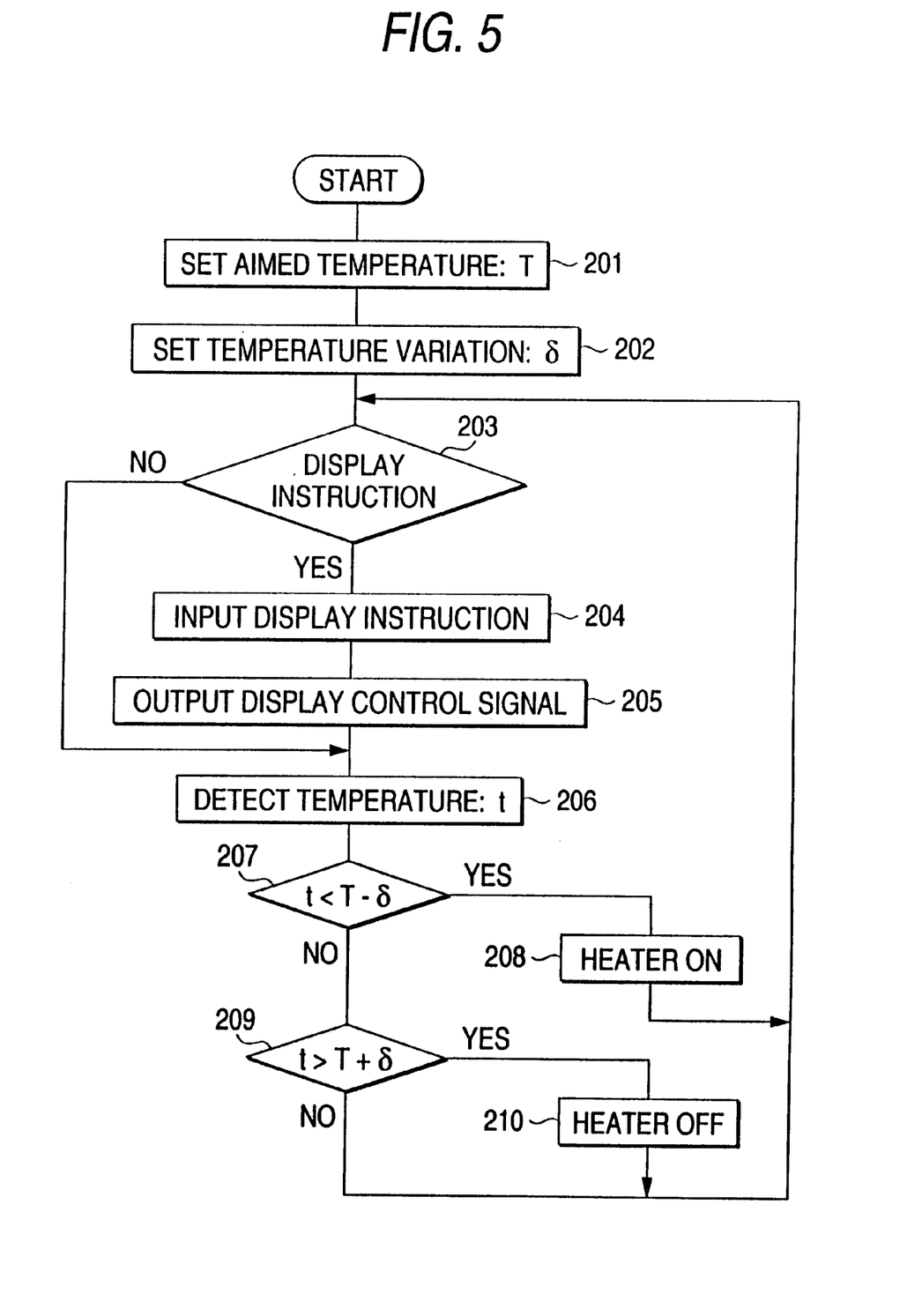
FIG. 5 is a flow chart for a description of the operation of a microcomputer in the display control device of the pump control section shown in FIG. 4.

FIGS. 4 and 5 show an example of a turbo-molecular pump in which the pump control section has a micro-computer adapted to control a liquid crystal display device, which constitutes a second embodiment of the invention. In the second embodiment, parts corresponding functionally to those already described with reference to the first embodiment are designated by the same reference numerals or characters.

The pump body (1) is an equivalent arrangement to the one in the first embodiment.

The pump control section (10) comprises: a magnetic bearing control device (11); a display system, namely, a liquid crystal display device (12); and a display control device (14) having a digital operating system, namely, a micro-computer (or one-chip micro-computer).

The magnetic bearing control device (11) is to control a magnetic bearing (3) based on the output signal of a position detecting device (4). The magnetic bearing control device (11) may be a conventional one of a digital type using a DSP or micro-computer, or of an analog type, and therefore, its detailed description will be omitted.

The liquid crystal display device (12) is to display, for instance, a state of the pump, and comprises a plurality of liquid crystal units. The liquid crystal display device (12) may be a conventional one, too, and therefore its detailed description will be omitted.

The display control device (14) controls the liquid crystal display device 12, and controls the on-off operation of the heater (5) based on the output signal of the temperature detecting device (6); that is, the temperature inside the pump body (1). More specifically, when other parts of the pump control section (10) provide display instructions, the micro-computer (13) applies display control signals to the corresponding liquid crystal display units. Similarly as in the case of the DSP (7) of the first embodiment, the micro-computer (13) detects whether or not the temperature inside the pump body (1) is in a predetermined variation range. When the temperature is lower than the variation range, the micro-computer turns on the heater; and when it is higher than the variation range, the micro-computer turns off the heater.

Now, an example of the operation of the micro-computer (13) in the display control device (14) will be described with reference to FIG. 5, a flow chart.

When the pump starts, the micro-computer (13) sets a designated temperature of the inside of the pump body (1) (Step 201), and sets a temperature variation (Step 202). It is assumed that the designated temperature set value is represented by T, and the temperature variation set value is represented by δ. Thereafter, the display control operations in Steps 203 through 205, and the heater control operations in Steps 206 through 210 are repeatedly carried out. In the display control operation, first it is detected that a display instruction has been provided (Step 203). When it is detected that the display instruction has been provided, Step 204 is effected. In Step 204, the display instruction is inputted, and the display control signal corresponding to the display instruction is applied to the corresponding liquid crystal display unit in the liquid crystal display device (12) (Step 205), and Step 206 is effected. When no display instruction is provided in Step 203, Step 206 is immediately effected. The heater control operations in Steps 206 through 210 are equal to those in Steps 106 through 110 of the first embodiment. When the operation of Step 208 has been accomplished, or when in Step 209 t is not larger than (T+δ), or the operation of Step 210 has been ended, Step 203 is effected again.

The display control device (8) may be one using a digital operating system such as a DSP.

With respect to the control of the electric motor adapted to rotate the rotor, the electric motor may be controlled with the magnetic bearing control device (11), or may be controlled with a motor control device which is provided only therefor.

What is claimed is:

1. A turbo-molecular pump comprising:
    a pump body including a rotor, a rotor position detector, a magnetic bearing, a temperature detector and a heater; and
    a pump control section including a single digital signal processor programmable by software or capable of executing programmed software,
    wherein said rotor position detector, said magnetic bearing, said temperature detector and said heater are operatively connected to said pump control section,
    wherein said rotor position detector and said magnetic bearing are operatively connected to said single digital signal processor, said single digital signal processor for controlling said magnetic bearing to hold a posture of said rotor along a plurality of axes,
    wherein said temperature detector and said heater are operatively connected to said single digital signal processor, said single digital signal processor for controlling said heater to hold a temperature variation range based on temperature detected by said temperature detector,
    wherein the software includes a position control operation and a heater control operation, which is capable of setting a temperature value and a predetermined temperature variation of said pump body to hold the temperature variation range in the heater operation, the position control operation is performed to control said magnetic bearing to hold a posture of said rotor along said plurality of axes at high speed, and the heater control operation is performed at periodic intervals based on a predetermined number of performed position control operations,
    wherein said plurality of axes includes at least an axial direction of said rotor, a first radial direction and a second radial direction perpendicular to said first radial direction at a first position of the axial direction, and a third radial direction and a fourth radial direction perpendicular to said third radial direction at a second position of the axial direction, and
    wherein said temperature detecting device detects a temperature of said pump body and said heater heats said pump body.

2. The turbo-molecular pump as claimed in claim 1, wherein said pump control section comprises a display operatively connected to said single digital signal processor.

3. The turbo-molecular pump as claimed in claim 2, wherein said single digital signal processor performs the control of said display system.

4. The turbo-molecular pump as claimed in claim 1, wherein said digital signal processor comprises dedicated hardware programmable by software or capable of executing a programmed software.

5. The turbo-molecular pump as claimed in claim 1, wherein said single digital signal processor controls said heater such that said heater turns on when said detected temperature is below a predetermined variation range, and
    wherein said single digital signal processor controls said heater such that said heater turns off when said detected temperature is above said predetermined variation range.

6. A turbo-molecular pump comprising:
    a pump body including a rotor, a rotor position detector, a magnetic bearing, a display system, a temperature detector and a heater;
    a first pump control section including a first digital operating system programmable by software or capable of executing programmed software; and
    a second control section including a single digital signal processor programmable by software or capable of executing programmed software,
    wherein said rotor position detector and said magnetic bearing are operatively connected to said first pump control section,
    wherein said rotor position detector and said magnetic bearing are operatively connected to said first digital operating system, said first digital operating system for controlling said magnetic bearing to hold a posture of said rotor along a plurality of axes,
    wherein said display system, said temperature detector and said heater are operatively connected to said second pump control section,
    wherein said display system, said temperature detector and said heater are operatively connected to said single digital signal processor, said single digital signal processor for controlling said heater to hold a temperature variation range based on temperature detected by said temperature detector,
    wherein the software of said first digital operating system includes a position control operation, which is performed to control said magnetic bearing to hold a posture of said rotor along said plurality axes at high speed, and wherein the software of said single digital signal processor includes a display control operation and a heater control operation, which is capable of setting a temperature value and a predetermined temperature variation of said pump body to hold the temperature variation range in the heater operation, the heater control operation being performed at periodic intervals based on a predetermined number of performed display control operations.

7. The turbo-molecular pump as claimed in claim 6, wherein said first digital operating system includes a digital signal processor comprising dedicated hardware programmable by software or capable of executing a programmed software.

8. The turbo-molecular pump as claimed in claim 6, wherein said single digital signal processor controls said heater such that said heater turns on when said detected temperature is below a predetermined variation range, and wherein said single digital signal processor controls said heater such that said heater turns on when said detected temperature is above said predetermined variation range.

* * * * *